United States Patent [19]

Delventhal et al.

[11] Patent Number: 4,955,763

[45] Date of Patent: Sep. 11, 1990

[54] GLASS DRILLING MACHINE

[75] Inventors: Kent A. Delventhal; Kenith E. Grosjean, both of Genoa, Ohio

[73] Assignee: Toledo Automated Concepts, Inc., Oregon, Ohio

[21] Appl. No.: 309,837

[22] Filed: Feb. 10, 1989

[51] Int. Cl.⁵ .............................................. B23B 39/22
[52] U.S. Cl. ........................................ 408/40; 408/236; 408/46; 125/20; 51/80 R; 51/283 R
[58] Field of Search ................. 408/30, 36, 37, 39, 408/40, 46, 52, 236; 51/111 R, 283 R, 80 R; 125/20

[56] References Cited

U.S. PATENT DOCUMENTS

| | | | |
|---|---|---|---|
| 2,592,640 | 4/1952 | Bailis | 51/111 R X |
| 2,941,338 | 6/1960 | Santschi | 51/111 R X |
| 3,124,016 | 3/1964 | Reaser | 77/21 |
| 3,443,819 | 5/1969 | Benjamin et al. | 279/20 |
| 3,461,615 | 8/1969 | Ferguson et al. | 408/39 X |
| 3,568,367 | 3/1971 | Myers | 408/37 |
| 3,746,459 | 7/1973 | Kindelan | 408/37 |
| 3,813,820 | 6/1974 | Highberg et al. | 408/37 X |
| 3,828,479 | 8/1974 | Highberg et al. | 408/39 X |
| 3,976,386 | 8/1976 | Maratette et al. | 408/52 X |
| 4,030,853 | 6/1977 | Mizen | 408/10 |
| 4,573,835 | 3/1986 | Eckardt et al. | 408/37 |
| 4,730,420 | 3/1988 | Stratmann et al. | 51/283 |

FOREIGN PATENT DOCUMENTS

| | | | |
|---|---|---|---|
| 135849 | 4/1985 | European Pat. Off. | 408/37 |
| 2415105 | 10/1974 | Fed. Rep. of Germany | 51/283 |
| 1044607 | 9/1983 | U.S.S.R. | 408/37 |

Primary Examiner—Eugene F. Desmond
Assistant Examiner—Robert Schultz
Attorney, Agent, or Firm—Thomas A. Meehan

[57] ABSTRACT

A glass drilling machine for drilling holes in a sheet of glass in which each hole is partly drilled from one side of the sheet and is then finish drilled from the opposite side. The machine is made up of aligned first and second drilling devices which are attached near the ends of first and second pivotable arms, respectively, the first and second arms being periodically pivoted toward and away from the sheet to bring the drilling devices into and out of drilling engagement with the sheet. The first and second arms are releasably clamped to first and second spindles, respectively, which pivot about first and second axes, respectively, the first and second axes being spaced apart but close to one another and positioned remote from the drilling devices. The position of the first arm is adjustable along its longitudinal axis by releasably clamping it to an eccentric portion of the first spindle, so that a change in the circumferential position of the first spindle relative to the first arm will longitudinally reposition the first arm. The position of the second arm is adjustable along the axis of the second spindle by releasably clamping an internally threaded portion of the second arm to an externally threaded portion of the second spindle so that a change in the circumferential position of the second spindle relative to the second arm will reposition the second arm along the axis of the second spindle.

32 Claims, 6 Drawing Sheets

GLASS DRILLING MACHINE

BACKGROUND OF THE INVENTION

1. Field Of The Invention

This invention relates to a machine for drilling holes in a relatively brittle planar material, such as glass, in which each hole must be partly drilled from one side of the planar member and then finish drilled from the opposite side. More particularly, this invention relates to a machine of the foregoing character with improved means for axially aligning the drilling devices on opposite sides of the planar member being drilled.

2. Description Of The Prior Art

It is known in the prior art that any hole in a glass sheet or other relatively brittle planar member should be drilled partly from one side of the sheet by a first drilling device and then finish drilled from the opposite side by a second drilling device. See, for example, U.S. Pat. Nos. 3,124,016 (W. E. Reaser); 3,568,367 (D. O. Myers); 3,813,820 (C. W. Highberg et al.); 4,573,835 (R. Eckardt et al.); and 4,730,420 (H. Stratmann et al.). In the arrangements of the foregoing patents, each drilling device is positioned at the end of an arm, and each arm is movable either arcuately about a common axis or rectilinearly toward and away from the sheet being drilled to bring the drilling devices into and out of engagement with the sheet being drilled. Good drilling practice requires that the drilling devices be axially aligned during drilling, and to ensure such axial alignment, it is important that the position of each drilling device be adjustable. Heretofore, such adjustment was provided by adjustably mounting each drilling device to the arm carrying such device, for example, by an adjustable dovetail fit between the drilling device and the arm. However, the drilling of glass sheets normally employs a cutting and cooling fluid which is directed at the location of the sheet being drilled, typically, in the case of a relatively large hole, by using a drill bit of annular configuration and by directing the fluid toward the sheet through the interior of the drill bit, and the fluid splashing which, thus, occurs in the drilling region tends to foul or contaminate the interengaging surfaces of the drilling device and the arm to which it is mounted, and complicates the making of adjustments of the drilling device relative to its arm.

SUMMARY OF THE INVENTION

According to the present invention there is provided a drilling machine for drilling holes in a glass sheet, or other brittle planar member, partly from one side by a first drilling device on the one side, and then finish drilled from the other side by a second drilling device on the other side. The first and second drilling devices are positioned at the ends of first and second arms, respectively, which are pivoted about spaced apart first and second axes, respectively, which are located away from the drilling devices, to bring the drilling devices into and out of engagement with the sheet being drilled. The end of the first arm which is remote from the drilling device attached to such arm is releasably clamped to an eccentric portion of a first spindle. The first spindle oscillates about the first axis which is spaced from the axis of the eccentric portion. Thus, by adjusting the circumferential position of the first spindle with respect to the first arm, the position of the first arm along its major longitudinal axis (front to rear of the drilling machine) can be adjusted, and the adjustment is made by structure which is remote from the drilling devices, and, thus, by structure which is unlikely to be contaminated or fouled by the cooling fluid which is used at the locations of the drilling devices. Further, the end of the second arm which is remote from the second drilling device is internally threaded and is releasably clamped to an externally threaded portion of a second spindle which is oscillated about its longitudinal axis. Thus, by adjusting the circumferential position of the second spindle with respect to the second arm, the position of the second arm along the axis of the second spindle, that is, along an axis transverse to the major longitudinal axis of the second arm (side to side of the drilling machine), can be adjusted, and again, as in the case of the first arm, by structure which is remote from the drilling devices.

Accordingly, it is an object of the present invention to provide a machine for drilling holes in a glass sheet or other brittle planar material. More particularly, it is an object of the present invention to provide a machine of the foregoing character which uses axially aligned drilling devices on opposite sides of such sheet or planar material and which provides for adjustment of the positions of the drilling devices relative to one another to ensure that their drilling axes can be precisely aligned. Even more particularly, it is an object of the present invention to provide a drilling machine of the foregoing character in which each drilling device is mounted at the end of an arm which is pivotable about an axis at its other end and in which the adjustments of the positions of the drilling devices relative to one another can be accomplished by adjusting the positions of the arms at the other ends thereof along separate axes for the separate arms which extend transversely of one another.

For a further understanding of the present invention and of the objects thereof, attention is directed to the drawing and the following brief description thereof, to the detailed description of the preferred embodiment and to the appended claims.

DETAILED DESCRIPTION OF THE PREFERRED EMBODIMENT

Figure 1:
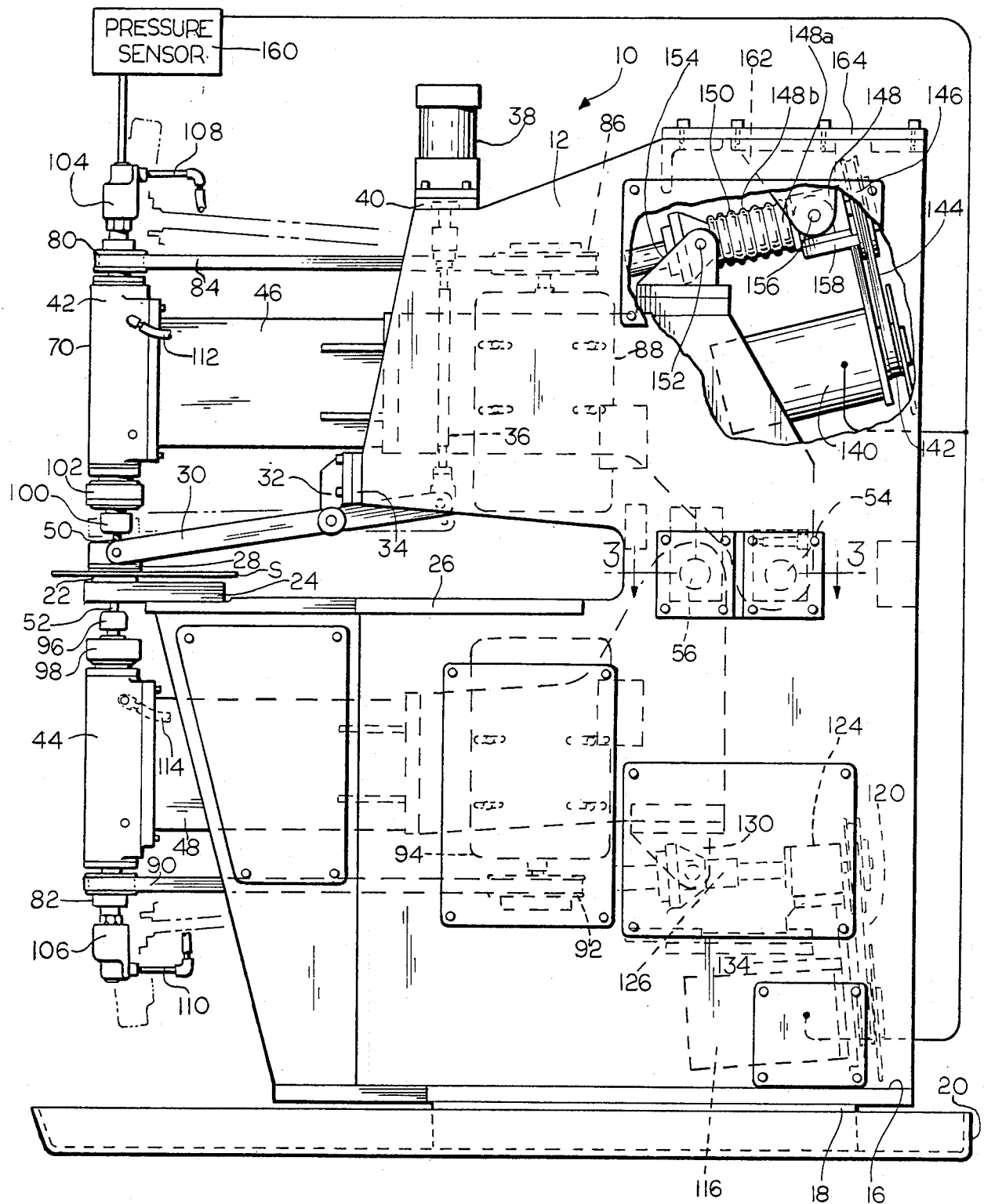
FIG. 1 is a partly broken away elevational view of the preferred embodiment of a drilling machine according to the present invention.
Figure 2:
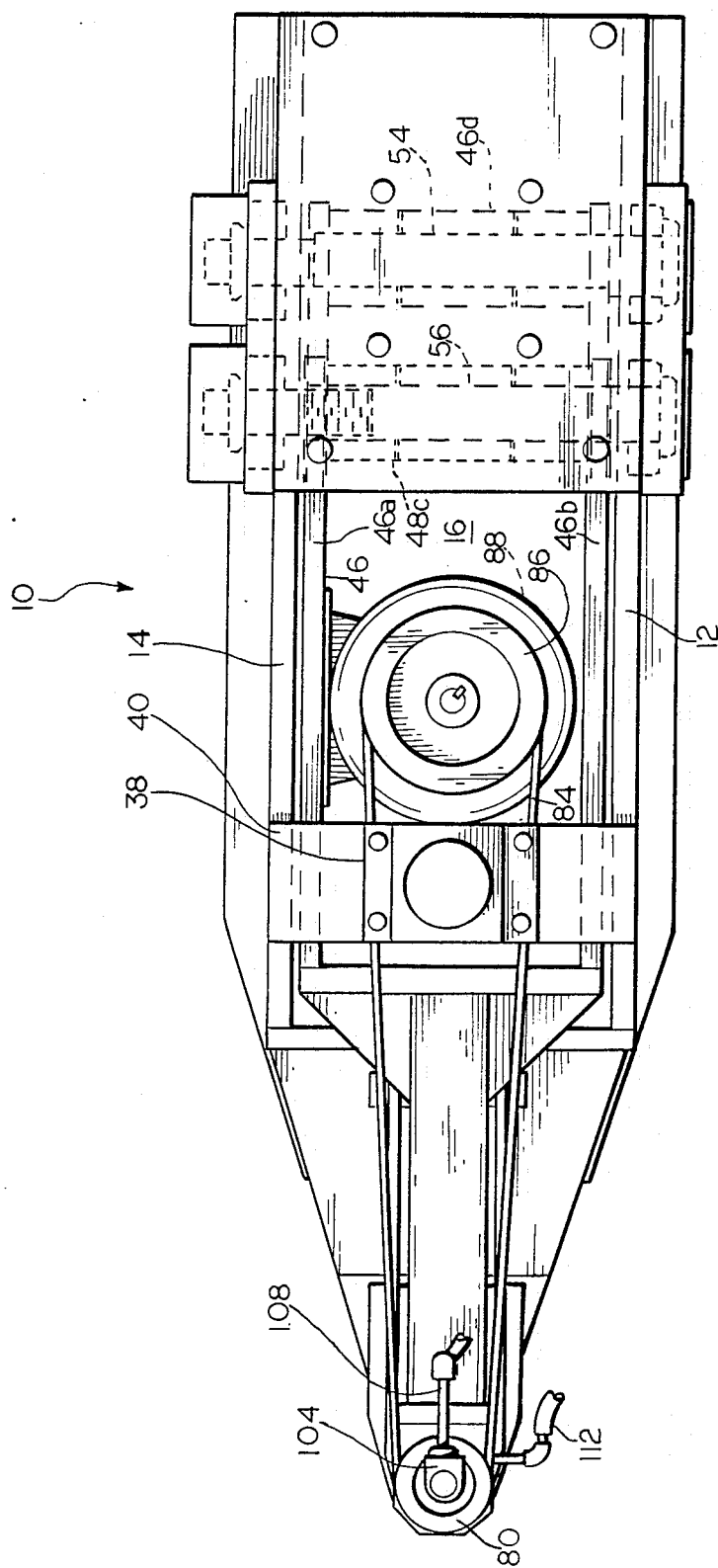
FIG. 2 is a plan view of the drilling machine of FIG. 1.

A drilling machine according to a preferred embodiment of the present invention is indicated generally by reference numeral 10 in FIGS. 1 and 2, and includes first and second spaced apart side plates 12 and 14, which extend vertically in the normal orientation of the machine 10 and which are welded or otherwise affixed to a transversely extending bottom plate 16. The bottom plate 16, in turn, is affixed to a block 18 which is positioned within an open top pan 20. As will be hereinafter explained more fully, the drilling operation of the machine 10 involves the use of a cutting and cooling fluid, and the pan 20 serves to catch or collect cutting fluid to permit its reuse or other disposition.

A glass sheet S, or other brittle planar object to be drilled by the machine 10, is positioned, relative to the machine 10, in a horizontal orientation of the sheet S with its bottom surface resting on an annular pad 22 whose position is fixed relative to the machine 10. The annular pad 22, which is of an impact absorbent material such as nylon, is affixed to a support 24 which, in turn, is affixed to a plate 26 which is affixed to the side plates 12 and 14 at an elevation above the bottom plate 16. Thus, the support 24 extends outwardly from the side plates 2 and 14 and permits the annular pad 22 to support the sheet S at a location which provides access for a drill to work on the sheet S within the annulus which is defined by the annular pad 22, as will be hereinafter explained more fully. The sheet S is temporarily fixedly positioned relative to the annular pad 22 by clamping it against the annular pad 22 by a second annular pad 28 of similar material which engages the top side of the sheet S, and which, as will also be hereinafter explained more fully, provides access for a drill to work on the sheet S within the annulus defined by the annular pad 28. The second annular pad 28 is pivotably attached at an end of a clamping arm 30 which is pivotably attached at a location between its ends to a bracket 32. The bracket 32 is bolted or otherwise affixed to a cross member 34 which is attached to the side plates 12 and 14, and extends transversely thereof. The opposed end of the clamping arm 30, in turn, is pivotably attached to a rod 36 which is reciprocated by a linear actuator 38, such as a pneumatic cylinder, and which is attached to a cross member 40, the cross member 40 being attached to the side plates 12 and 14 and extending transversely thereof. Thus, the lifting of the rod 36 by the actuator 38 will result in the lowering of the second annular pad 28 into clamping engagement with the sheet S, and the retraction of the rod 36 by actuator 38 will result in the lifting of the second annular pad 28 out of clamping engagement with the sheet S to permit the sheet S to be removed from, or repositioned with respect to, the machine 10.

Holes are drilled in the sheet S from opposite sides thereof by axially aligned first and second drilling devices 42 and 44 which are mounted, respectively, at the ends of first and second arms 46 and 48. Preferably the drilling devices 42 and 44 operate in such a way that the lower drilling device, the drilling device 44, drills a hole approximately one-half way through the sheet S followed by the drilling of the remainder of such hole by the upper drilling device 42, which will cause the plug formed in the drilling operation to fall with a gravity assist into the pan 20. The drilling devices 42 and 44 carry rotatable drill bits 50 and 52, respectively, and the drill bits 50 and 52 are advanced into and retracted out of drilling engagement with the sheet S, through the annular pads 28 and 22, respectively, by oscillating the arms 46 and 48 in a vertical plane. To that end, the arm 46, which is made up of spaced apart arm segment 46a and 46b and a sleeve 46c (FIG. 3) which extends therebetween and which is attached thereto, at a location somewhat remote from the drilling device 42, has its sleeve 46c releasably clamped to a first oscillatable spindle 54 which oscillates about an axis that extends generally horizontally and transversely of the arm 46. Similarly the arm 48, which is made up of spaced apart arm segments 48a and 48b and a sleeve 48c, at a location remote from the drilling device 44, has its sleeve 48c releasably clamped to a second oscillatable spindle 56 which oscillates about an axis which spaced from, but is near, the axis of oscillation of the first spindle 54 and which extends generally parallel thereto, the spacing between the central axes of the spindles 54 and 56 being small in relation to the lengths of the arms 46 and 48.

Figure 3:
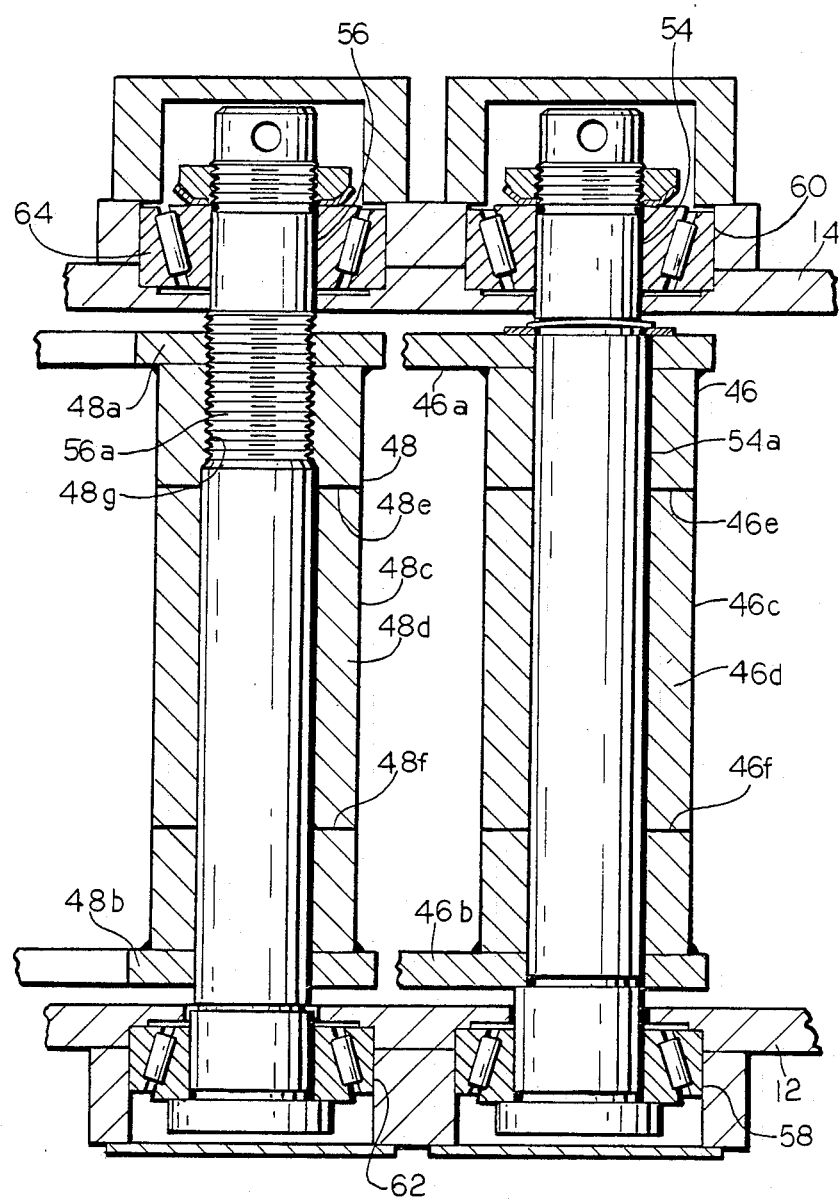
FIG. 3 is a fragmentary sectional view taken on line 3—3 of FIG. 1, at an enlarged scale.
Figure 4:
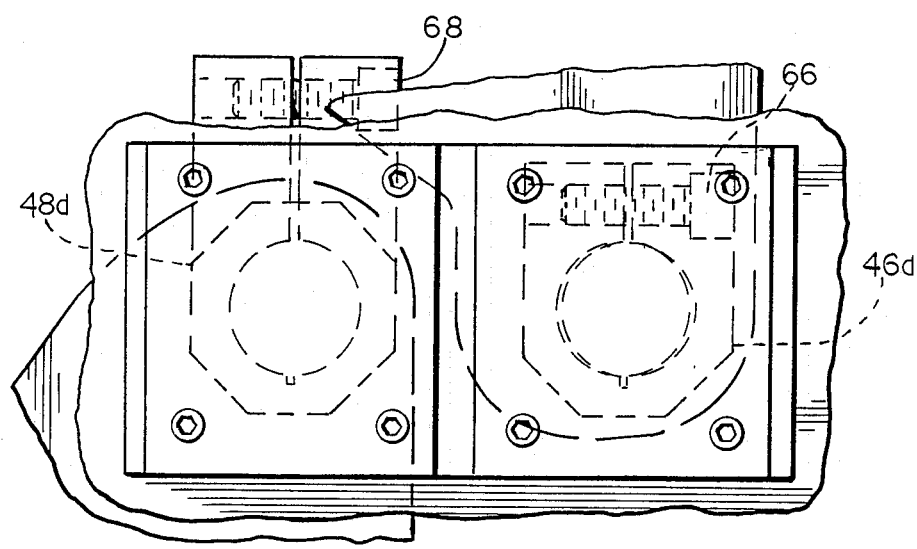
FIG. 4 is a fragmentary elevational view of the portion of the drilling machine which is illustrated in FIG. 3.
Figure 5:
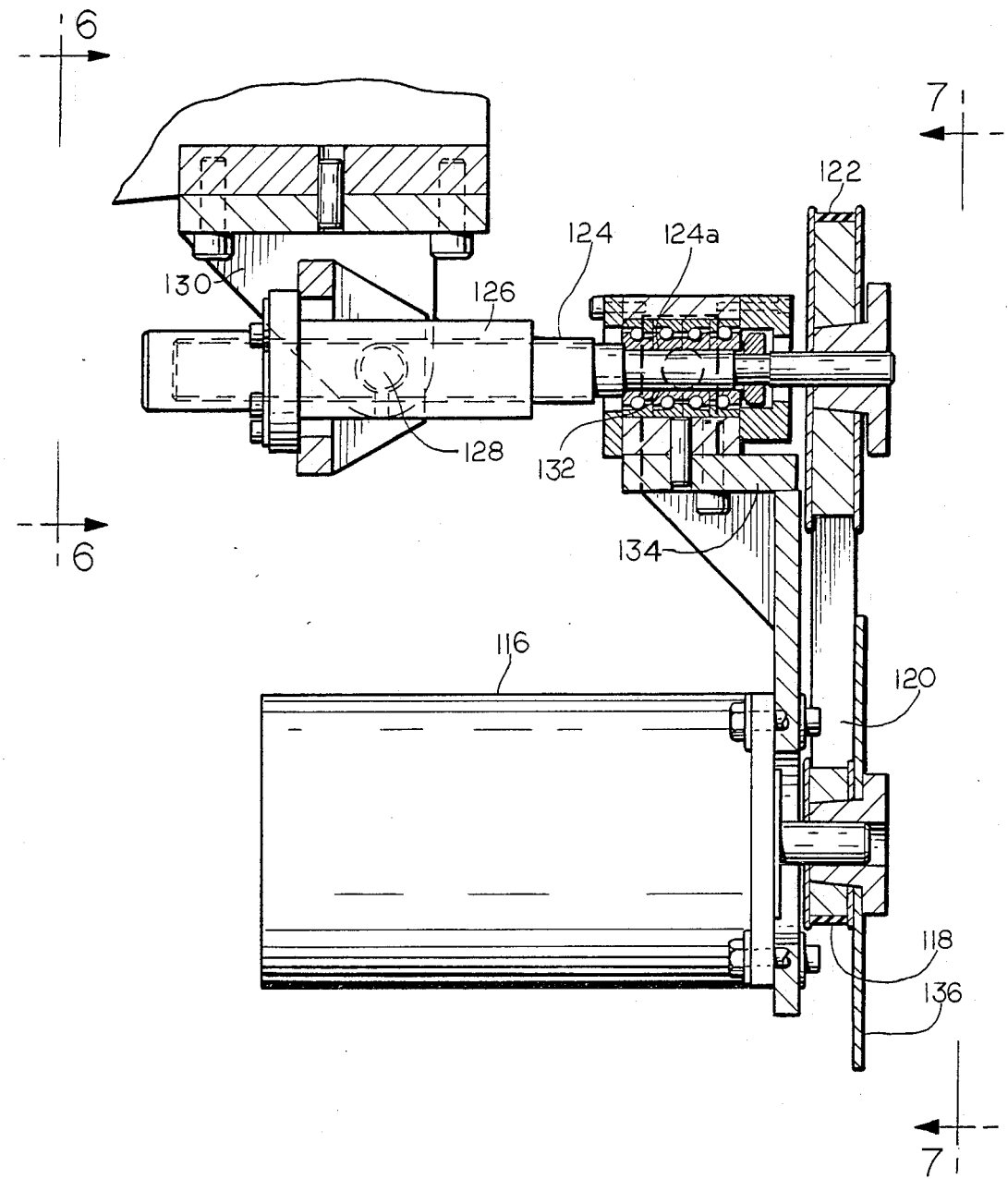
FIG. 5 is a fragmentary elevational view, partly in section, of a portion of the drilling machine of FIGS. 1-4 with certain portions of the drilling machine being broken away.
Figure 7:
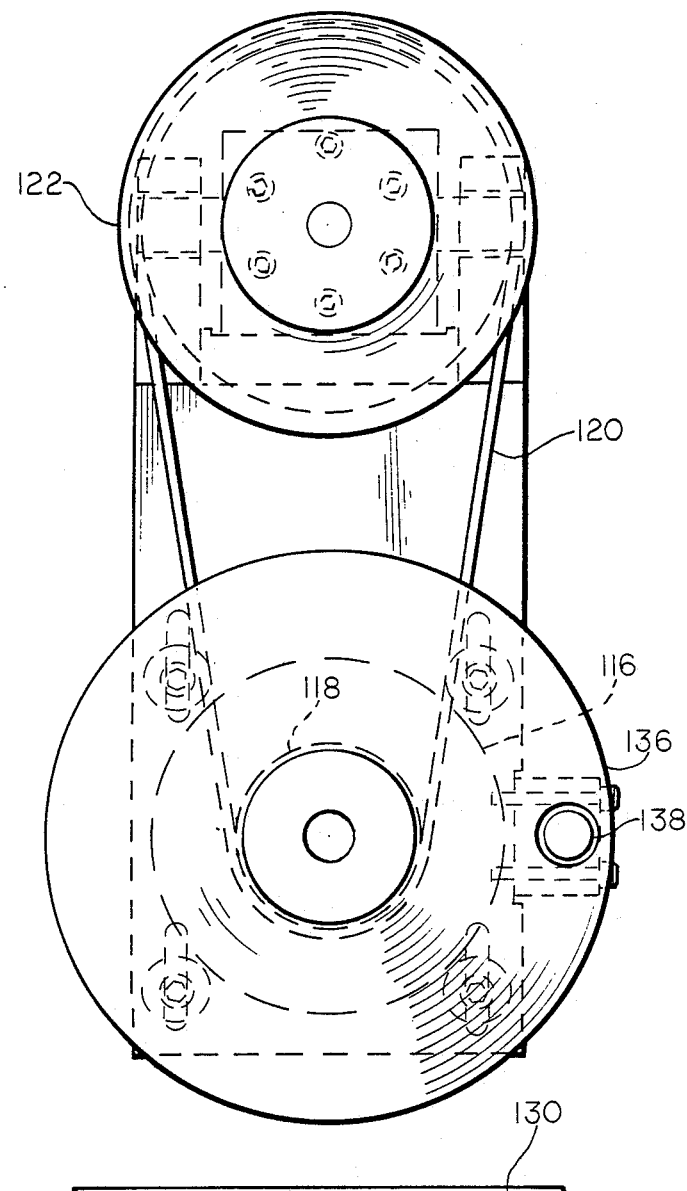
FIG. 7 is a view taken on line 7—7 of FIG. 5.
Figure 6:
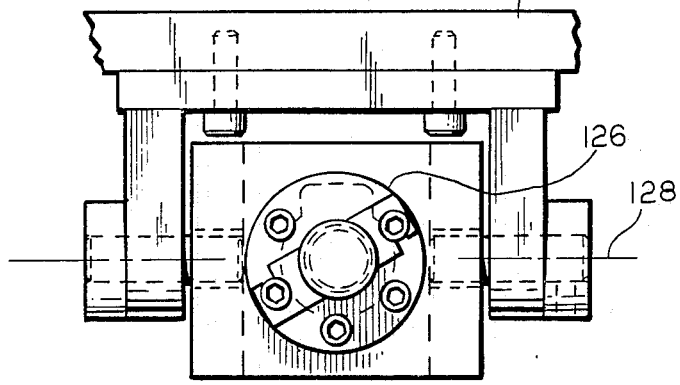
FIG. 6 is a view taken on line 6—6 of FIG. 5.

As is shown in FIG. 3, the spindles 54 and 56 extend through the side plates 12 and 14 of the machine 10 and are journalled for rotation with respect to the side plates 12 and 14 by roller bearings 58 and 60, respectively, in the case of the spindle 54, and by roller bearings 62 and 64, respectively, in the case of the spindle 56. Because the distance between each of the drilling devices 42 and 44 and the axis of oscillation of the arm to which it is attached, arms 46 and 48, respectively, is large in relation to the thickness of the sheet S, the motion of each of the drill bits 50 and 52 relative to the sheet S during the drilling cycle will be that of a straight line and, thus, the configuration of the complete hole formed by the drill bits 50 and 52 will be cylindrical, for all practical purposes. Further, as is clear from FIG. 1, the axes of the spindles 54 and 56 lie in the plane of the sheet S so that the drilling action of the rotatable drill bits will be normal to the plane of the sheet S, for all practical purposes.

The spindle 54 has an eccentric cylindrical central portion 54a whose central axis is spaced from the central axis of the portions of the spindle 54 which are journalled in the bearings 58 and 60. The arm 46, whose sleeve 46c is provided with a centrally located split spindle engaging portion 46d which is separated from the remainder of the sleeve 46c by spaced apart double ended saw cuts 46e and 46f, which extend transversely of the central axis of the sleeve 46c, is positioned with its spindle engaging portion 46d releasably non-rotatingly engaging the eccentric central portion 54a of the spindle 54, the split spindle engaging portion 46d being provided with a pair of spaced apart tightening cap screws 66, only one of which is shown in the drawing. The cap screws 66 permit the split spindle engaging portion 46d to be so tighted with respect to the eccentric central portion 54a of the spindle 54 that no relative rotational or circumferential movement can occur between the arm 46 and the spindle 54, and this is the normal operating condition of the arm 46 and the spindle 54. However, when the cap screws 66 are loosened, the spindle 54 can be turned or circumferentially moved within the sleeve 46c relative to the arm 46, and because the arm 46 engages only the eccentric central portion 54a of the spindle 54, as heretofore explained, the turning of the spindle 54 relative to the sleeve 46c of the arm 46 will adjust the position of the arm 46 along its longitudinal axis, either in a forward or rearward direction, as desired. This adjustment of the position of the arm 46 results in the adjustment of the position of the first drilling device 42, and especially the first drill bit 50, along such longitudinal axis, and does so in a very precise and closely controlled manner.

The spindle 56 has an externally helically threaded portion 56a at a location between the ends of the spindle which are journalled in the bearings 62 and 64. The arm 48, whose sleeve 48c is provided with an internally helically threaded spindle engaging portion 48g, which is complemental with the threaded portion 56a of the spindle 56, is provided with a centrally located split spindle engaging portion 48d which is separated from the remainder of the sleeve 48c by spaced apart double ended saw cuts 48e and 48f which extend transversely of the central axis of the sleeve 48c, and which is positioned with its spindle engaging portion 48d releasably non-rotatingly threadably engaging the threaded portion 56a of the spindle 56, the split spindle engaging portion 48d being provided with a pair of spaced apart tightening cap screws 68, only one of which is shown in the drawing. The cap screws 68 permit the split spindle engaging portion 48d to be so tightened with respect to the unthreaded portion of the spindle 56 which is surrounded thereby that no relative rotational or circumferential movement can occur between the arm 48 and the spindle 56, and this is normal operating condition of the arm 48 and the spindle 56. However, when the cap screws 68 are loosened, the spindle 56 can be turned or circumferentially moved within the sleeve 48c relative to the arm 48, and because the only engagement between the arm 48 and the spindle 56 is the threaded engagement between the internally threaded spindle engaging portion 48g of the arm 48 and the externally threaded portion 56a of the spindle 56, as heretofore explained, the turning of the spindle 56 within the sleeve 48c relative to the arm 48 will adjust the arm position of the arm 48 along the longitudinal axis of the spindle 56, that is, transversely of the longitudinal axis of the arm 48, either to one side of the machine 10 or the other. This adjustment in the position of the arm 48 results in the adjustment of the position of the second drilling device 44, and especially the second drill bit 52, along such transverse axis and does so in a very precise and closely controlled manner. Because of the ability to separately, precisely and controllably adjust the positions of the drilling devices 42 and 44 along axes which extend transversely of one another, as heretofore explained, it is possible to very precisely axially align the drill bits 50 and 52 of the drilling machine 10 for high quality drilling.

Figure 8:
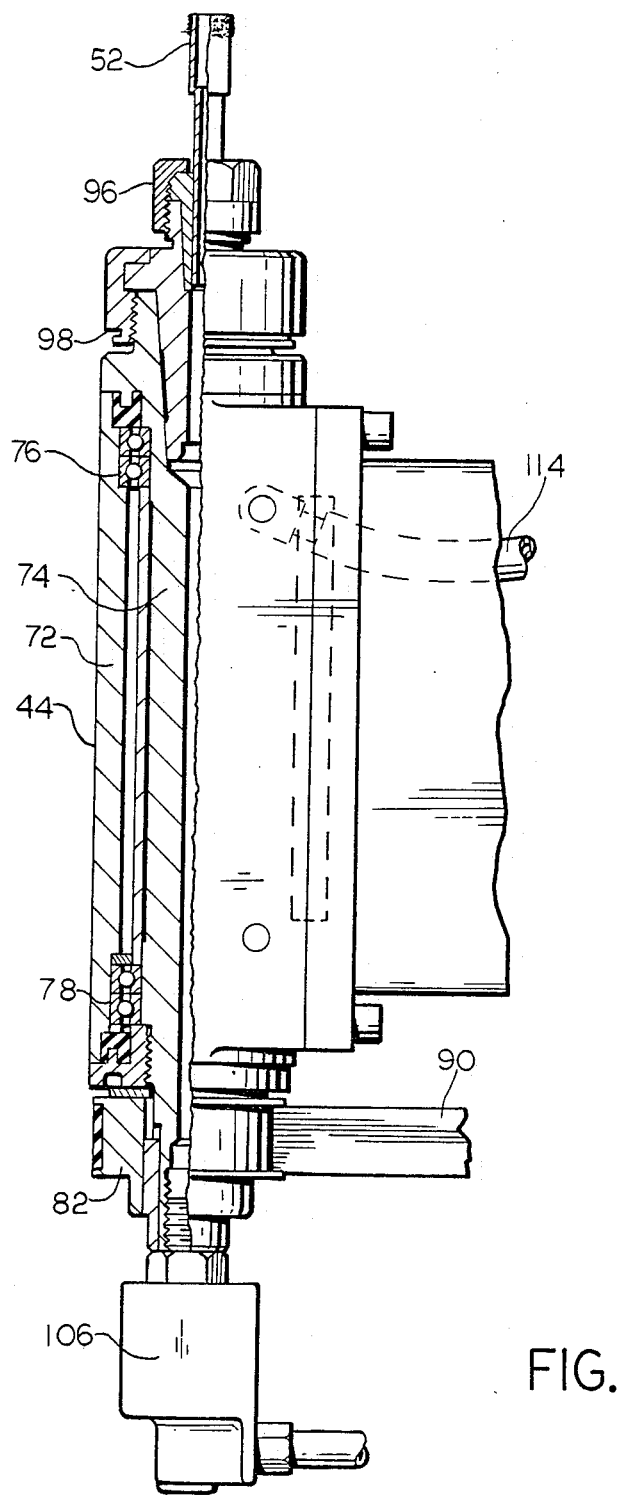
FIG. 8 is a fragmentary elevational view, partly in section and at an enlarged scale, of a portion of the drilling machine of FIGS. 1-7.

As is shown most thoroughly in FIG. 8 in connection with the drilling device 44, the drilling devices 42 and 44 each have a non-rotatable outer casing, 70 and 72, respectively, and each of them is provided with a rotatable annular inner member, the inner member of the drilling device 44 being identified by the reference numeral 74 in FIG. 8, the inner member of the drilling device 42 being hidden by the outer casing 70 in FIG. 1. In the case of the drilling device 44, spaced apart bearing 76 and 78 are positioned between the inner member 74 and the outer casing 72 to permit the inner member 74 to rotate with respect to the outer casing 72, and similar spaced apart bearings, not shown, are provided to permit the inner member of the drilling device 42 to rotate with respect to the outer casing 70. In any case, each such inner member has a driven sheave keyed to an extension thereof, the driven sheaves for the drilling devices 42 and 44 being identified by reference numerals 80 and 82, respectively. The driven sheave 80 is driven by a flexible belt 84, preferably a standard V-belt, which is trained therearound and which is also trained around a drive sheave 86 that is keyed to an output shaft of an electrical drive motor 88 which, as is shown in FIG. 2, is attached to the arm 46. Similarly, the driven sheave 82 of the drilling device 44 is driven by a flexible belt 90, again, preferably a standard V-belt, which is trained therearound and which is also trained around a drive sheave 92 that is keyed to an output shaft of an electrical drive motor 94, the motor 94 being attached to the arm 48. Because of the fact that the motors 88 and 94 are attached to the arms to which the drilling devices which are operated thereby are attached, namely, the arm 46 in the case of the drilling device 42 and the arm 48 in the case of the drilling device 44, the periodic oscillation of the arms 46 and 48, as heretofore described, does not lead to any change in relative positions between the sheaves 80 and 86, on the one hand, and between the sheaves 82 and 92, on the other hand.

As is shown in FIG. 8 in connection with the drilling device 44, the drill bit 52 is securely engaged by a chuck 96 which, in turn, is securely engaged by a second chuck 98. The second chuck 98, in turn, is securely engaged by the inner member 74, and is removeable therefrom for adjustment. The use of a double chuck arrangement, involving separate chucks 96 and 98, as heretofore described, facilitates very precise positioning of the drill bit 52 along the longitudinal axis of the drilling device 44 for precise control of the depth of the hole in the sheet S which is to be drilled thereby. Similarly, in the case of the drilling device 42, the drill bit 50 is contained in a first chuck 100 which, in turn, is contained in a second chuck 102. The second chuck 102, in turn, is contained in the inner member, not shown, of the drilling device 42. Thus, the drill bit 50 can also be precisely positioned, along the longitudinal axis of the drilling device 42, for accurate control of the depth of the hole drilled thereby in the sheet S.

Because of the heat which is generated in the drilling of a hole in a glass sheet, and the damage which can be done to the glass as a result of such heat, as heretofore explained, a cutting and cooling fluid is used during the drilling of the sheet S. To that end, as heretofore mentioned, each of the drill bits 50 and 52 is annular in configuration, and the inner member of each of the drilling devices 42 and 44 is also annular in configuration. Because of the annular configuration of such members, cooling fluid can be introduced during the drilling process through the interior of each of the drill bits 50 and 52, and the drilling devices 42 and 44, respectively, are provided with inlets 104 and 106, respectively, which receive a suitable cutting and cooling fluid from a source of supply, not shown, through flexible inlet lines 108 and 110, respectively. Further, oil mist lubricating lines 112 and 114 leading from a source of lubricating oil, not shown, are provided to ensure proper lubrication of the bearings within the drilling devices 42 and 44, respectively, that is, in the case of the drilling device 44, the bearings 76 and 78. It is noted, in the present invention as heretofore described, that the position adjustments of the drilling devices 42 and 44 are performed at locations remote therefrom, that is, at the locations of the spindles 54 and 56, and, thus, at locations which are not likely to be fouled or contaminated with cutting and cooling fluid which is directed against the sheet S at the locations of the drilling devices 42 and 44 or with glass particles or other debris which is generated as a result of the drilling operation performed by the drilling devices 42 and 44, or which is otherwise present at the drilling location.

The arm 48 is pivoted about the central axis of the first spindle 56 toward and away from the sheet S, into and out of a position where the drill bit 52 is in engagement with the sheet S, in small incremental steps, for example, steps which result in a movement of the top of the drill bit 52 toward or away from the sheet S approximately 0.001 inch, by a conventional stepping motor 116 which rotates in small, precise intermittent steps, for example, steps of approximately 1.8°. The stepping motor 116 has a drive sheave 118 affixed to its output shaft and a drive belt 120, preferably, a non-slip, cogged timing belt, is trained around the drive sheave 118 and around a driven sheave 122 which is mounted on a rotatable spindle 124a of a ball screw 124. The spindle 124a of the ball screw 124 is rotatable within a ball nut 126 which is pivotally attached at an axis 128 to a member 130 which is attached to the arm 48, the portion of the spindle 124a between the ball screw 124 and the ball nut 126 preferably being surrounded by a bellows type elastomerics boot, not shown, to prevent fouling of the relatively moving parts of the assembly which includes the ball screw 124 and the ball nut 126. To avoid alignment problems between the ball screw 124 and the ball nut 126 as a result of pivoting movement of the ball nut 126 about the axis 128, which inherently will result from the oscillation of the arm 48 as a result of the linear translation of the ball nut 126 on the spindle 124a of the ball screw 124, as hereinafter explained, the ball screw 124 is pivotally attached to the side plate 12 of the machine 10 by structure, not shown, for pivoting movement about an axis 132 extending transversely of the axis of rotation of the spindle portion 124a. Further, the motor 116 and the ball screw 124 are attached to the legs of a floating L-shaped member 134, whereby the L-shaped member 134, the motor 116 and the ball screw 124, together with their sheaves 118 and 122, respectively, and the belt 120 pivot in unison about the pivot axis 132. Thus, when the motor 116 rotates in incremental steps, as heretofore described, the rotatable spindle 124a of the ball screw 124 will also rotate in incremental steps, and this will result in linear translation of the ball nut 126 along the central axis of the ball screw 124 in incremental steps and, in turn, pivoting movement of the arm 48 toward or away from the sheet S, again in incremental steps. To assist in the original positioning of the arm 48, the output shaft of the motor 116 has a plate 136 affixed thereto for rotation therewith. The plate has a locating hole 138 positioned at a single location therein, and a magnetic switch, not shown, is provided to position the arm 48 at a predetermined or home position of the locating hole 138 when it is desired to adjust the number of forward and reverse steps which are to be made in the operation of the motor 116 to result in the proper advance and retraction of the drill bit 52 for precise positioning thereof Similarly, the arm 46 is pivoted about the central axis of the first spindle 54 toward and away from the sheet S, into and out of a position where the drill bit 50 is in engagement with the sheet S, in small incremental steps, for example, steps of approximately 0.001 inch, by a conventional stepping motor 140, which is shown partly in hidden line in FIG. 1 and which rotates in small, precise incremental steps, for example, steps of approximately 1.8°. The stepping motor 140 has a drive sheave 142 affixed to its output shaft and a drive belt 144, preferably, a non-slip, cogged timing belt, is trained around the drive sheave and around a driven sheave 146 which is mounted on a rotatable spindle 148a of a ball screw 148. The spindle 148a of the ball screw 148 is rotatable within a ball nut 150 which is pivotably attached at an axis 152 to a member 154 which is attached to the arm 46, the portion of the spindle between the ball screw 148 and the ball nut 150 preferably being surrounded by a bellows type elastomeric boot 148b to prevent fouling of the relatively moving parts of the assembly which includes the ball screw 148 and the ball nut 150. To avoid alignment problems between the ball screw 148 and the ball nut 150 as a result of pivoting movement of the ball screw 148 about the axis 152 which inherently will result from the oscillation of the arm 46 as a result of the linear translation of the ball nut 150 on the spindle 148a of the ball nut, as hereinafter explained, the ball screw 148 is pivotally attached to a plate 162, which, in turn, is attached to a plate 164 which is attached to the plates 12 and 14 and which extends transversely thereof, for pivoting movement about an axis 156 transversely of the axis of rotation of the spindle portion 148a of the ball screw 148. Further, the motor 140 and the ball screw 148 are attached to the legs of an L-shaped member 158, whereby the L-shaped member 158, the motor 140 and the ball screw 148 together with their sheaves 142 and 146, respectively, and the belt 144 pivot in unison about the pivot axis 156. Thus, when the motor 140 rotates in incremental steps, as heretofore described, the rotatable spindle 148a of the ball screw 148 will also rotate in incremental steps, and this will result in linear translation of the ball nut 150 along the central axis of the ball screw 148 in incremental steps and, in turn, pivoting movement of the arm 46 toward or away from the sheet S, again in incremental steps. Like the positioning plate 136 of the motor 116, the motor 140 is also provided with a positioning plate, not shown, for positioning the arm 46 at a predetermined or home position when it is desired to adjust the number of forward and reverse steps which are to be made in the operation of the motor 140 to result in the proper advance and retraction of the drill bit 50 for precise positioning thereof.

It is to be understood that it is also within the contemplation of the present invention that substantially continuously acting motors can be used in place of the intermittently acting stepping motors 116 and 140. For example, it is contemplated that servo motors could be used in place of the stepping motors 116 and 140, and this would provide for positive feedback with respect to the positions of the drilling devices 42 and 44, a feature which is not present when stepping motors are used.

Since the final drilling of the hole in the sheet S is preferably done by the upper drill bit 50, as heretofore explained, there will be a sudden and appreciable reduction in the back pressure of the cooling fluid in the inlet 104 of the first drilling device 42 upon the disengagement of a glass plug from the hole of the sheet S which is being formed by the drilling devices 42 and 44, and there will be no such sudden and appreciable reduction in cooling fluid back pressure if the hole is not drilled to proper depths by the drilling devices 42 and 44 such that no plug fall therefrom. This fact may be used to control the operation of either or both of the motors 116 and 140 to increase the number of steps performed by each during the drilling cycle. To that end, a fluid pressure sending device 160, shown schematically, may be provided to sense fluid back pressure in the inlet 104 during each drilling cycle and to increase the number of steps taken by either or both of the motors 116 and 140 during the next drilling cycle if a sudden and appreciable reduction in such fluid back pressure does not occur at the end of a drilling cycle.

In the operation of the machine 10, the arm 46 will normally travel approximately 1 inch between its fully extended drilling position and its normal retracted position awaiting the insertion of a new sheet S for another drilling cycle, and in the case of the lower arm 48, this travel distance is approximately 1.5 inch. The home, or fully retracted position of each of the arms 46 and 48 is approximately 2.5 inch from the fully extended drilling position of each such arm.

Although the best mode contemplated by the inventors for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. A machine for drilling a hole in a sheet of a relatively brittle planar material, said machine comprising:
   support means for positioning the sheet at a drilling location;
   first rotary drilling means for drilling a first hole into the sheet from one side of the sheet, the first hole extending partly through the thickness of the sheet;
   secondary rotary drilling means for drilling a second hole into the sheet from the other side of the sheet, the second hole being substantially aligned with the first hole and forming a complete hole with the first hole, the complete hole extending through the sheet;
   a first arm having a first end and a second end, said first rotary drilling means being secured to said first arm at a location adjacent said first end of said first arm;
   means mounting said first arm for pivot movement relative to said support means, the pivot movement of said first arm being in a plane extending generally transversely through the drilling location and being about a first axis extending through said first arm at a location adjacent said second end of said first arm, whereby said first rotary drilling means can be moved toward and away from the drilling location;
   a second arm having a first end and a second end, said second rotary drilling means being secured to said second arm at a location adjacent said first end of said second arm;
   means mounting said second arm for pivot movement relative to said support means, the pivot movement of said second arm being in a plane extending generally transversely through said drilling location and being about a second axis extending through said second arm at a location adjacent said second end of said second arm, whereby said second rotary drilling means can be moved toward and away from the drilling location, said second axis being spaced from said first axis;
   first adjusting means for adjusting the position of said first arm and said first rotary drilling means along an axis extending longitudinally of said arm; and
   second adjusting means for adjusting the position of said second arm and said second rotary drilling means along said second axis whereby to permit the adjustment of the position of the first rotary drilling means relative to the position of the second rotary drilling means.

2. A machine according to claim 1 and further, said eccentric portion being rotatably engageable with said first arm after release of clamping to provide for movement of said arm upon a change in the circumferential position of said first spindle, said first arm will adjust said position of said first arm along said axis extending longitudinally of said first arm.

3. A machine according to claim 2 and further comprising:
   a second pivotable spindle, said second arm being releasably secured to said second spindle for pivoting therewith about said second axis, and wherein said second adjusting means comprises an externally threaded portion of said second spindle and an internally threaded portion of said second arm, said internally threaded portion of said second arm being releasably clamped to and threadably engaging said externally threaded portion of said second spindle whereby changing the circumferential position of said second spindle relative to said second arm will adjust said position of said second arm along said second axis.

4. A machine according to claim 1, and further comprising:
   first motion means for moving said first arm in incremental steps through a first arc about said first axis, said first motion means comprises a first stepping motor having a first rotatable drive shaft and further comprising means for translating rotational motion of the first drive shaft of said first stepping motor into lineal motion, said means for translating being connected to said first arm; and
   second motion means for moving said second arm in incremental steps through a second arc about said second axis, said second motion means comprising a second stepping motor having a second rotatable drive shaft and further comprising second means for translating rotational motion of the second drive shaft of said second stepping motor into lineal motion, said second means for translating being connected to said second arm.

5. A machine according to claim 1 and further comprising:
   first cooling fluid supply means for supplying cooling fluid to said first rotary drilling means during the drilling of the first hole; and
   second cooling fluid supply means for supplying cooling fluid to said second rotary drilling means during the drilling of the second hole.

6. A machine according to claim 5 wherein;
   said first rotary drilling means comprises a first annular drill bit and first annular rotating means for rotating said first annular drill bit;
   said second rotary drilling means comprises a second annular drill bit and second annular rotating means for rotating said second annular drill bit;
   said first cooling fluid supply means supplies cooling fluid through said first annular drill bit and said first annular rotating means; and
   said second cooling fluid supply means supplies cooling fluid through said second annular rotating means.

7. A drilling machine according to claim 1 wherein said support means for positioning comprises first support means for engaging the one side of the sheet and second support means for engaging the other side of the sheet, one of said first support means and said second support means being fixed in its position, and the other of said first support means and said second support means being movable in a plane extending generally transversely of the sheet, and further comprising:

means for moving said other of said first support means and said second support means in said plane extending transversely of the sheet into and out of engagement with the sheet.

8. A drilling machine according to claim 7 wherein each of said first support means and said second support means is annular in configuration, wherein said first rotary drilling means comprises a first drill bit which drills the first hole into the sheet through a first annulus defined by one of said first support means and said second support means, and wherein said second rotary drilling means comprises a second drill bit which drills the second hole into the sheet through a second annulus which is defined by the other of said first support means and said second support means.

9. A machine according to claim 4 wherein said first means for translating comprises a first ball screw means for converting incremental rotary motion of said first stepping motor into incremental linear motion, and wherein said second motion means for translating comprises a second ball screw means for converting incremental rotary motion of said second stepping motor into incremental linear motion.

10. A machine according to claim 6 and further comprising:
   first motion means for moving said first arm in incremental steps through a first arc about said first axis, said first motion means comprising a first stepping motor;
   second motion means for moving said second arm in incremental steps through a second arc about said second axis, said second motion means comprising a second stepping motor; and
   means responsive to cooling fluid back pressure in one of said first cooling supply means and said second cooling fluid supply means for controlling the operation of one of said first stepping motor and said second stepping motor to increase the motion of the one of the first arm and second arm operated by said one of said first stepping motor and said second stepping motor in the event that the first hole and the second hole do not form a complete hole, as evidenced by the failure of the cooling fluid back pressure to fall suddenly and appreciably at the end of a drilling cycle.

11. A machine according to claim 1 wherein;
   the distance between said first rotary drilling means and said first axis is very large in relation to the depth of the first hole, and
   wherein the distance between said second rotary drilling means and said second axis is substantially greater than the depth of the second hole, whereby;
   the configuration of the complete hole formed by the first drilling device and the second drilling device will be cylindrical, for all practical purposes.

12. A machine according to claim 1 wherein; the spacing between said first axis and said second axis is substantially smaller than the spacing between said first end and said second end of said first arm.

13. A machine according to claim 1 wherein said first rotary drilling means comprises a first drill bit, a first chuck for holding said first drill bit, and a second chuck for holding said first chuck, wherein said second rotary drilling means comprises a second drill bit, a third chuck, and a first rotatable member for holding said second chuck, and a second rotatable member for holding said third chuck, for holding said third chuck.

14. A machine according to claim 1 wherein said first axis, said second axis, and said drilling location are substantially coplanar.

15. A machine for drilling a generally vertically oriented hole in a generally horizontally oriented sheet of a relatively brittle planar material, said machine comprising:
   support means for positioning the sheet in a generally horizontal orientation at a drilling location;
   first rotary drilling means for drilling a first hole generally vertically into the sheet from the top of the sheet, the first hole extending partly through the thickness of the sheet;
   second rotary drilling means for drilling a second hole generally vertically into the sheet from the bottom of the sheet, the second hole being substantially aligned with the first hole and forming a complete, substantially cylindrical hole, the complete hole extending through the sheet;
   a first arm having a first end and a second end, said first rotary drilling means being secured to said first arm at a location adjacent said first end of said first arm;
   means mounting said first arm for pivot movement relative to said support means, the pivot movement of said first arms being in a substantially vertical plane and being about a first, generally horizontally extending axis at a location adjacent said second end of said first arm, whereby said first rotary drilling means can be moved toward and away from the drilling location;
   a second arm having a first end and a second end, said second rotary drilling means being secured to said second arm at a location adjacent said first end of said second arm;
   means mounting said second arm for pivot movement relative to said support means and to said first arm, the pivot movement of said second arm being in a substantially vertical plane and being about a second, generally horizontally extending axis at a location adjacent said second end of said second arm, whereby said second drilling means can be moved toward and away from the drilling location, said second axis being spaced from said first axis;
   first adjusting means for adjusting the position of one of said first arm and said second arm along an axis extending longitudinally of said one of said first arm and said second arm; and
   second adjusting means for adjusting the position of the other of said first arm and said second arm along the one of said first axis and said second axis about which said other of said first arm and said second arm pivots, whereby to permit the adjustment of the position of the first rotary drilling means relative to the position of the second rotary drilling means.

16. A machine according to claim 15 wherein said one of said first arm and said second arm is said first arm.

17. A machine according to claim 15 and further comprising:
   a first pivotable spindle, said one of said first arm and said second arm being releasably secured to said first spindle for pivoting therewith about the one of said first axis and said second axis about which said one of said arm and said second arm pivots, and wherein said first adjusting means comprises an eccentric portion of said first spindle, said one of said first arm and said second arm being releasably clamped to said eccentric portion, said eccentric portion being rotatably engageable with said first arm after release of clamping to provide for movement of said arm upon a change in the circumferential position of said first spindle, whereby changing the circumferential position of said first spindle relative to said one of said first arm and said second arm will adjust the position of said one of said first arm and said second arm along said axis extending longitudinally of said one of said first arm and said second arm.

18. A machine according to claim 17 and further comprising:
   a second pivotable spindle, said other of said first arm and said second arm being releasably secured to said second spindle for pivoting therewith about said one of said first axis and said second axis, and wherein said second adjusting means comprises an externally threaded portion of said second spindle and an internally threaded portion of said other of said first arm and said second arm, said internally threaded portion of said second spindle being releasably clamped to and threadably engaging said externally threaded portion whereby changing the circumferential position of said second spindle relative to said other of said first arm and said second arm will adjust said externally threaded portion of said other of said first arm and said second arm along said one of said first axis and said second axis about which said other of said first arm and said second arm pivots.

19. A machine according to claim 17 wherein said one of said first arm and said second arm is said first arm.

20. A machine according to claim 18 wherein said one of said first arm and said second arm is said first arm.

21. A machine according to claim 15 and further comprising:
   first motion means for moving said first arm in incremental steps through a first arc about said first axis, said first motion means comprising a first stepping motor having a rotatable drive shaft and further comprising first means for translating rotational motion of the drive shaft of said first stepping motor into lineal motion, said first means for translating being connected to said first arm; and
   second motion means for moving said second arm in incremental steps through a second arc about said second axis, said second motion means comprising a second stepping motor having a second rotatable drive shaft and further comprising second means for translating rotational motion of the second drive shaft of said second stepping motor into lineal motion, said second means for translating being connected to said second arm.

22. A machine according to claim 15 and further comprising:
   first cooling fluid supply means for supplying cooling fluid to said first rotary drilling means during the drilling of the first hole; and
   second cooling fluid supply means for supplying cooling fluid to said second rotary drilling means during the drilling of the second hole.

23. A machine according to claim 22 and further comprising;

said first rotary drilling means comprises a first annular drill bit and first annular rotating means for rotating said first annular drill bit;
said second rotary drilling means comprises a second annular drill bit and second annular rotating means for rotating said second annular drill bit;
said first cooling fluid supply means supplies cooling fluid through said first annular drill bit and said first annular rotating means; and
said second cooling fluid supply means supplies cooling fluid through said second annular drill bit and said second annular rotating means.

24. A machine according to claim 15 and wherein said means for positioning comprises first support means for engaging the bottom of the sheet and second support means for engaging the top of the sheet, said first support means being fixed in its position, said second support means being movable in its position in a generally vertically extending plane, and further comprising:
   means for moving said second support means in said generally vertically extending plane into and out of engagement with the sheet.

25. A machine according to claim 24 wherein each of said first support means and said second support means is annular in configuration, wherein said first drilling means comprises a first drill bit which drills the first hole into the sheet through a first annulus defined by said first support means, and wherein said second drilling means comprises a second drill bit which drills the second hole into the sheet through a second annulus defined by said second support means.

26. A machine according to claim 21 wherein said first means for translating comprises a first ball screw means for converting incremental rotary motion of said first stepping motor into incremental linear motion, and wherein said second means for translating comprises a second ball screw means for converting incremental rotary motion of said second stepping motor into incremental linear motion.

27. A machine according to claim 23 and further comprising:
   first motion means for moving said first arm in incremental steps through a first arc about said first axis, said first motion means comprising a first stepping motor having a rotatable drive shaft and further comprising first means for translating rotational motion of the drive shaft said first stepping motor into lineal motion, said first means for translating being connected to said first arm;
   second motion means for moving said second arm in incremental steps through a second arc about said second axis, said second motion means comprising a second stepping motor having a rotatable drive shaft and further comprising second means for translating rotational motion of the drive shaft of said second stepping motion into lineal motion, said second means for translating being connected to said second arm; and
   means responsive to cooling fluid back pressure in said first cooling fluid supply means for controlling the operation of one of said first stepping motor and said second stepping motor to increase the motion of the one of said first arm and said second arm operated by said one of said first stepping motor and said second stepping motor in the event that the first hole and the second hole do not form a complete hole, as evidenced by the failure of the cooling fluid back pressure to fail suddenly and appreciably at the end of a drilling cycle.

28. A machine according to claim 15 wherein;
the distance between said first rotary drilling means and said first axis is substantially greater than the depth of the first hole, and
wherein the distance between said second rotary drilling means and said second axis is substantially greater than the depth of the second hole, whereby;
the configuration of the complete hole formed by the first drilling device and the second drilling device will by cylindrical, for all practical purposes.

29. A machine according to claim 15 wherein;
the spacing between said first axis and said second axis is substantially smaller than the spacing between said first end and said second end of said first arm.

30. A machine according to claim 15 wherein said first rotary drilling means comprises a first drill bit, a first chuck for holding said first drill bit, a second chuck for holding said first chuck, and a first rotatable member for holding said second chuck wherein said second rotary drilling means comprises a second drill bit, a third chuck for holding said second drill bit, a fourth chuck for holding said third chuck and a second rotatable member for holding said fourth chuck.

31. A machine according to claim 30 wherein said first arm carries first motor means for imparting rotational movement to said first drill bit, said first chuck and said second chuck, and wherein said second arm carries second motor means for imparting rotational movement to said second drill bit, said third chuck and said fourth chuck.

32. A machine according to claim 15 wherein said first axis, said second axis and said drilling location are substantially coplanar.

* * * * *

UNITED STATES PATENT AND TRADEMARK OFFICE
CERTIFICATE OF CORRECTION

PATENT NO. : 4,955,763

DATED : September 11, 1990

INVENTOR(S) : Kent A. Delventhal and Kenith E. Grosjean

It is certified that error appears in the above-identified patent and that said Letters Patent is hereby corrected as shown below:

In the Abstract, at the end, add --A cooling fluid is circulated through the drilling devices against the sheet, and a pressure sensor can be provided to sense cooling fluid back pressure, which will fall suddenly and appreciably at the conclusion of a drilling cycle if a slug drops from the sheet, to control the operation of the machine to ensure the completion of the drilling cycle.-- column 3, line 19, "2" should be --12--.

Claim 1, column 9, line 59, after "said" insert --first--.

Claim 2, column 9, line 66, after "further" insert --comprising: a first pivotable spindle, said first arm being releasably secured to said first spindle for pivoting therewith about said first axis, and wherein said first adjusting means comprises an eccentric portion of said first spindle, said first arm being releasably clamped to said eccentric portion--,
    column 10, line 2, after "spindle," insert --whereby changing the circumferential position of said first spindle relative to--.

Claim 3, column 10, line 16, after "spindle" insert a --,--.

Claim 9, column 11, line 20, delete "motion".

Claim 11, column 11, line 48, delete "very large in relation to" insert --substantially greater than--.

UNITED STATES PATENT AND TRADEMARK OFFICE
CERTIFICATE OF CORRECTION

PATENT NO. : 4,955,763

DATED : September 11, 1990

INVENTOR(S) : Kent A. Delventhal and Kenith E. Grosjean

It is certified that error appears in the above-identified patent and that said Letters Patent is hereby corrected as shown below:

Claim 13, column 11, line 63, delete "and",
    column 11, line 64, after "chuck," insert --and a first rotatable member for holding said second chuck, and--
    column 11, line 66, after "chuck" insert --for holding said second drill bit--,
    column 11, line 66, delete "and a first rotatable member for holding said second chuck" and insert --a fourth chuck for holding said third chuck,-- and
    column 11, lines 67 and 68, delete "for holding said third chuck,".

Claim 17, column 12, line 66, after "said" (first occurrence) insert --first--.

Claim 27, column 14, line 57, "motion" should be --motor--.

Claim 30, column 16, line 5, after "chuck" insert --and--.

Signed and Sealed this

Twenty-eighth Day of January, 1992

Attest:

HARRY F. MANBECK, JR.

*Attesting Officer*      *Commissioner of Patents and Trademarks*